(12) United States Patent
Peighambardoust et al.

(10) Patent No.: US 8,221,814 B2
(45) Date of Patent: Jul. 17, 2012

(54) PROCESS FOR THE SEPARATION OF GLUTEN AND STARCH AND PRODUCTS PREPARED FROM SAID PROCESS

(75) Inventors: Seyed Hadi Peighambardoust, Wageningen (NL); Atze Jan van der Goot, Ede (NL); Robert Jan Hamer, Amersfoort (NL); Remko Marcel Boom, Ede (NL)

(73) Assignee: Cargill Inc., Wayzata, MN (US)

( * ) Notice: Subject to any disclaimer, the term of this patent is extended or adjusted under 35 U.S.C. 154(b) by 865 days.

(21) Appl. No.: 11/914,311

(22) PCT Filed: May 19, 2006

(86) PCT No.: PCT/NL2006/050122
§ 371 (c)(1),
(2), (4) Date: Dec. 4, 2008

(87) PCT Pub. No.: WO2006/123932
PCT Pub. Date: Nov. 23, 2006

(65) Prior Publication Data
US 2009/0202689 A1   Aug. 13, 2009

(30) Foreign Application Priority Data
May 19, 2005   (EP) .................................... 05104257

(51) Int. Cl.
*A21D 13/06* (2006.01)
(52) U.S. Cl. ........ 426/478; 426/271; 426/446; 426/549; 426/560; 426/555; 426/656
(58) Field of Classification Search .................. 426/271, 426/478, 446, 549, 560, 555, 656
See application file for complete search history.

(56) References Cited

U.S. PATENT DOCUMENTS

| | | | | |
|---|---|---|---|---|
| 3,857,987 A | * | 12/1974 | Rogols et al. .................. | 426/436 |
| 4,879,133 A | * | 11/1989 | Endo et al. ..................... | 426/653 |
| 6,451,553 B1 | * | 9/2002 | Olsen ........................... | 435/68.1 |
| 2005/0287267 A1 | * | 12/2005 | Maningat et al. ............. | 426/549 |

FOREIGN PATENT DOCUMENTS

| | | |
|---|---|---|
| EP | 0 282 038 A | 9/1988 |
| JP | 5-103617 * | 4/1993 |

OTHER PUBLICATIONS

Peighambardoust et al., "A New Method to Study Simple Shear Processing of Wheat Gluten-Starch Mixtures," *Cereal Chemistry*, 2004, pp. 714-721, vol. 81, No. 6, AACC International, St. Paul, MN, USA.

* cited by examiner

*Primary Examiner* — Anthony Weier
(74) *Attorney, Agent, or Firm* — Gilberto M. Villacorta; Sunit Talapatra; Foley & Lardner, LLP

(57) ABSTRACT

The present invention relates to a process for the separation of gluten and starch from wheat flour, wherein in a first step the wheat flour is converted into a dough having a moisture content of less than 50 wt %, based on dry weight of the flour. The dough is in a subsequent step subjected to an essential simple shear flow with a shear stress of at least 1 kPa and a specific mechanical energy input of at least 5 kJ/kg per minute processing time to obtain a processed dough. It is preferred that the apparatus used for performing this step includes a reactor of the cone-and-plate type or the cone-cone-type wherein an absolute velocity profile across the conical gap is present. In a final step, the processed dough is separated into a gluten enriched fraction and a starch enriched fraction. The gluten enriched fraction is very suitable for bakery applications.

27 Claims, 3 Drawing Sheets

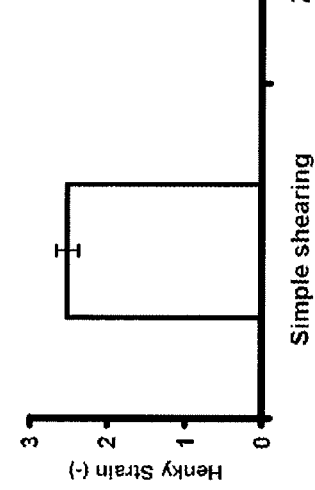
*Fig 1b* Extensibility
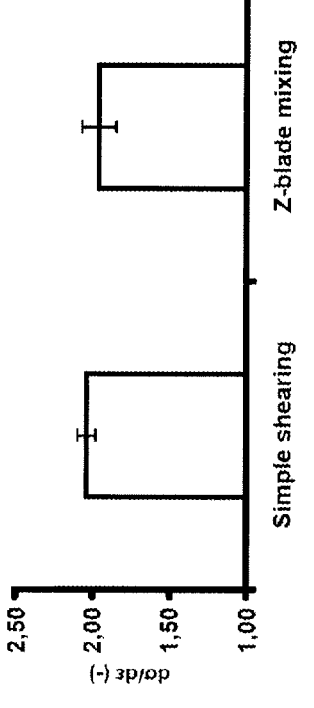
*Fig 1d* Strain hardening index
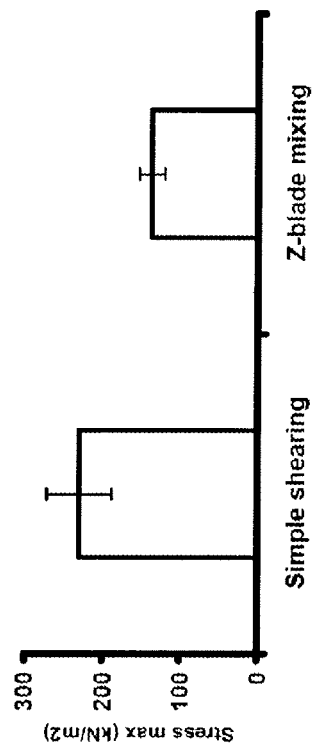
*Fig 1a* Maximimum stress
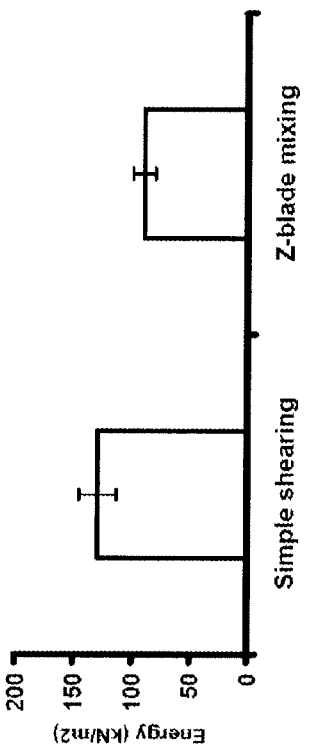
*Fig 1c* Energy to extend

PROCESS FOR THE SEPARATION OF GLUTEN AND STARCH AND PRODUCTS PREPARED FROM SAID PROCESS

FIELD OF THE INVENTION

The invention relates to a process for the separation of wheat flour into gluten and starch. The present invention also relates to a process for making a dough having improved properties and to a gluten enriched fraction and gluten obtained there from having improved properties, in particular a higher maximum stress and extensibility.

TECHNICAL BACKGROUND

Separation of wheat flour into vital gluten and starch is an important industrial process. The isolated gluten proteins have diverse applications, e.g. as texturising or adherence agents, as wheat flour improvers in the bread-making industry, while the starch produced is processed into sugar syrups or used in industrial applications in general and the food industry in particular.

Industrially such gluten-starch separation processes always involve at least one wet separation step, such as the conventional "Martin process". In the Martin process, wheat flour and water are mixed into a dough and the starch is extracted from the dough by washing with water.

Another example of a process involving a wet separation step is disclosed in EP A 090.533, wherein in a first step wheat flour is mixed with water to obtain a dough. The gluten aggregates formed during mixing are then washed while gently kneading. Starch is separated from the slurry by this washing step or by centrifugation with decanters or hydrocyclones, and the non-soluble gluten are recovered from the slurry by sieving followed by drying over a ring drying using air of about 100°-150° C. In case of flash drying higher temperatures up to even 300° C. are often applied. The drying step is very critical, since gluten can easily be damaged by severe heating and lose its functionality. Typically, gluten resulting from these processes have a protein content of 75-80%, based on dry matter.

A disadvantage of these separation processes is that copious amounts of water are used that need to be purified afterwards. Secondly, the gluten will always suffer from a certain amount of heat damage. Thirdly, inherent to the current process is the loss of soluble proteins, which are washed away, and losses through gluten-starch and gluten-NSP complexes probably formed during kneading. These gluten-NSP complexes cannot be purified to vital gluten with current technologies. Fourth, overkneading is a known problem with prior art processes and often results in lower yields. Additionally, in a continuous process, it is difficult to prevent overkneading and often requires the selection of wheat of high quality which leads to higher raw material costs. In other words, since the prior art process heavily relies on optimal mixing of the dough, the mixing step has to be adjusted to compensate for differences in flour quality. Also, the prior art process seems less suitable (lower yield) for flour of poor breadmaking quality.

A further drawback is the requirement of a kneading step, which is recognized in the art to influence the amount of an important fraction of glutenin aggregates, referred to as glutenin macro polymer (GMP). Whereas kneading of dough is essential to establish an initial wet separation, prolonged kneading times disadvantageously results in a significant part of the gluten being lost in an unrecoverable gluten-polysaccharide complex. Besides, it should be noted that the effect of kneading time on product quality is dependent on the flour quality used.

EP A 010.447 teaches a method where agglomeration of gluten is achieved by dilution of a fully developed dough obtained by mixing 0.6-1 part water per part by weight of flour with a conventional mixer, further diluting this dough with 0.5-3 parts of water per part by weight of dough and either simultaneously or subsequently applying shear to the mixture, whereby the gluten agglomerates. Recalculating on shows that the inventors doughs with a moisture content varying from 0.58-0.88 based on dry weight of the flour. Shearing is applied by e.g. heavy agitating and/or pumping the dough water mix through a narrow orifice. According to T. R. G. Jongen et al. Cereal Chem. 80, 383-389 (2003), this mixing process is somewhat confusingly called "shearing", but actually consists of a combination of three components, i.e. shear flow, rotational flow and elongational flow. In the article of Jongen et al., a scalar parameter D is used to distinguish pure rotational flow (D=−1), pure shear flow (D=0) and pure elongational flow (D=+1) which will be discussed in more detail below. Consequently, the process according to EP A 010.447—together with the first kneading step to obtain the dough—is indifferent from conventional kneading processes. Moreover, the additional dilution step and the relatively high water temperature of 40°-50° C. are believed to reduce the product quality even further.

Furthermore, EP A 282.038 discloses a process for the preparation of a water-insoluble, modified gluten product that is obtained by (a) kneading a mixture of wheat flour, L-ascorbic acid, cystine and water, (b) mixing the dough as obtained in step (a) under a high shear force, preferably in an extruder, a meat-chopper or a machine which can mix dough under a high shearing force (cf. EP A 282.038, page 5, line 28), wherein the gluten are mechanically broken down into smaller molecules and the content of proteins soluble in 0.05 N aqueous acetic acid is increased to an amount of 75 to 85 wt. %, based on the total protein content of the dough, and (c) separating the water-insoluble, modified gluten from the dough. However, mixing processes involving high shear consists of the combination of the three components shear flow, rotational flow and elongational flow as described above. The process according to the present invention, however, only involves shear flow which is defined in this document as "simple shear" or "simple shear flow". In addition, the process according to the invention provides gluten products having properties different from the gluten products known from the prior art.

SUMMARY OF THE INVENTION

It is an object of the invention to provide a process for the separation of gluten and starch from flour with higher protein yields, improved protein quality, and with a substantial reduction of the loss of soluble proteins.

The present invention relates to a process for the separation of gluten and starch from flour, said process comprises the steps of:
(a) mixing a flour and an aqueous liquid to obtain a dough having a moisture content of less than 50% based on dry weight of the flour;
(b) subjecting the dough obtained in step (a) to a essential simple shear flow with a shear stress of at least 1 kPa and a specific mechanical energy input of at least 5 kJ/kg to obtain a processed dough; and (c) separating the processed dough into a gluten enriched fraction and a starch enriched fraction.

DESCRIPTION OF THE FIGURES

FIGS. 1a-1d show the large deformation fracture properties of gluten obtained by two different processes, i.e., the process according to the present invention and the conventional process involving z-blade mixing.

DETAILED DESCRIPTION OF THE INVENTION

Figure 2:
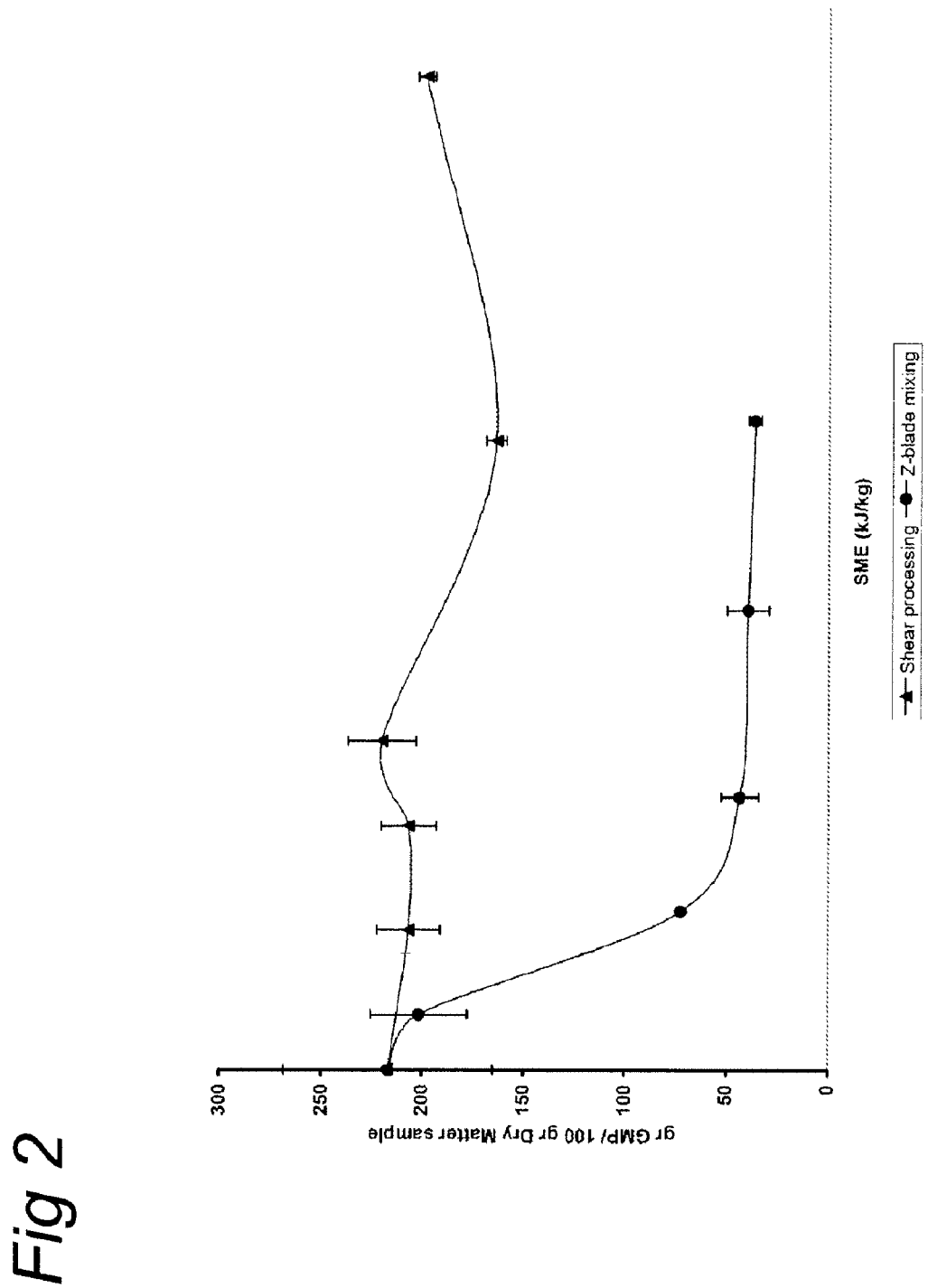
FIG. 2 shows the GMP content of the dough prepared from Spring flour with the process according to the present invention.

In this document and in its claims, the verb "to comprise" and its conjugations is used in its non-limiting sense to mean that items following the word are included, but items not specifically mentioned are not excluded. In addition, reference to an element by the indefinite article "a" or "an" does not exclude the possibility that more than one of the element is present, unless the context clearly requires that there be one and only one of the elements. The indefinite article "a" or "an" thus usually means "at least one".

Essential for this invention is that it must be understood that in normal kneading processes, i.e. processes involving kneading and/or pumping steps, that are known in the prior art, all three kinds of deformations occur: (1) uniaxial extension, (2) simple shear and (3) solid body rotation. T. R. G. Jongen et al. Cereal Chem. 80, 383-389 (2003), incorporated by reference herein, performed a theoretical study on various kneader configurations including Farinograph, Do-corder, mixograph and Eberhart spiral mixers. They defined the flow parameter D which can be used to distinguish between rotational, simple shear and elongational flow, that is D=−1 for pure rotational flow, D=0 for pure simple shear flow and D=+1 for pure elongational flow. Jongen et al. state that the Farinograph mixer would provide elongation, shear and rotation in about equal amounts which presumably explains the D value (close to zero) shown in Table I. The Do-corder mixer would provide much elongation and little rotation, the mixograph mixer would provide much simple shear and little rotation and the Eberhart mixer would provide pronounced rotation. It further appeared that the mixers would provide pronounced shear flow predominantly near the moving parts and the walls. Nevertheless, in all the investigated mixers all three types of deformation, i.e. rotation, simple shear and elongation, occur. It must be noted that rotation does in fact not provide deformation.

In the process of the present invention, however, essentially only one kind of deformation occurs, i.e. simple shear. The term "simple shear" is well known in the art and implies that material planes slide over each other in only one direction (cf. C. W. Macosko, "Rheology, Principles, Measurements and Applications", VCH Publishers, Inc., New York (1994), in particular pages 27-29, 40 and 70-75; incorporated by reference herein). Accordingly, the process according to the present invention is conducted with an "essential simple shear flow" which is here defined as deformation conditions wherein the elongation rate $\epsilon$ is less than $10 \text{ s}^{-1}$. The process should not reduce the GMP content to values lower than 70% (preferably not lower than 80, more preferably not lower than 90%) of the original GMP content in the flour.

The term "specific mechanical energy" (SME) is also known in the art and is calculated on the basis of a cone and plane device as elucidated in S. H. Peighambardoust et al., Cereal Chem. 81, 714-721 (2004), incorporated by reference. In fact, since the torque during mixing is recorded continuously, the specific mechanical energy can be calculated from the torque vs. processing time curves of the mixing device used and the rotational speed of the mixing arms of the mixing device by the following formula:

$$SME = \frac{\omega}{m} \int_{t=0}^{t_f} M(t) \cdot dt$$

wherein $\omega$ is the rotational speed ($s^{-1}$), m is the mass of the material in the device (kg), M(t) is the torque at time t (Nm) which is a measure for the force applied to the material to be deformed and continuously measured and recorded and $t_f$ the processing or shearing time (s). The specific mechanical energy is expressed in kJ/kg and can be calculated at any time t.

Wheat flours vary in composition The gluten agglomeration and separation can be carried out using hard or soft wheat. However, it is preferred that the flour has a moisture content of less than 20 wt. % and an ash content of less than 1 wt. %, based on the total weight of the flour.

The moisture content of the dough as obtained in step (a) is less than 50%, more preferably less than 45%, based on dry weight of the flour. It has thus been found that the water content of the dough can be maintained at relatively low levels.

The dough obtained in step (a) can for example be a zero-developed dough (ZD-dough). The ZD-dough can be prepared by the method according to D. T. Campos et al., Cereal Chemistry 73, 105-107 (1996) with modifications as disclosed in S. H. Peighambardoust et al., Cereal Chemistry 81, 714-721 (2004), which are both incorporated by reference herein. In this method, a powdered ice mixture that was being sieved to an average particle size of about 700 μm is blended with the flour at low temperature, preferably at a temperature of about −25° C., with the desired weight ratios in a Waring blender and the flour is uniformly distributed at a reduced speed. Optionally, the blend can be stored in closed containers at low temperature. Mixing of these ingredients must be performed at low SME-values, preferably below 5 kJ/kg and more preferably below 2.5 kJ/kg, since it is preferable that the amount of energy transferred to the gluten is as low as possible. Consequently, a ZD-dough according to this document is defined as a dough made by mixing at least flour and water in a weight ratio of 1:9 to 9:1, based on the total weight of the dough, with an mechanical energy input in terms of SME of lower than 5 kJ/kg, preferably lower than 2.5 kJ/kg.

Another method for preparing the dough as obtained in step (a) may be the RAPIDOJET procedure wherein a high pressure water jet is used that catches falling flour particles in the air (cf. www.rapidojet.de; Dr. B. Noll, "Presentation of the RAPIDOJET-procedure: Fast, energy saving and dust free dough preparation by using a high pressure water jet"; cf. also US 2004/0022917, incorporated by reference herein).

According to the present invention, it is preferred that the shear stress employed in step (b) is at least 1 kPa, more preferably at least 2, even more preferably at least 5 kPa and in particular at least 10 kPa. There is no maximum of the shear stress that can be used, although it is in general preferred that the shear stress is not higher than 100 kPa, preferably not higher than 75 kPa.

The specific mechanical energy (SME) input is at least 5 kJ/kg, preferably at least 5.5 kJ/kg, more preferably at least 10.0 kJ/kg, even more preferably at least 25.0 kJ/kg and most preferably 50.0 kJ/kg. Although it appears that an upper limit of the SME input is not critical, it is recommended that it is not higher than 500 kJ/kg.

The aqueous composition employed in step (a) of the present invention is preferably water or a diluted salt solution having preferably an ionic strength of 0.05 to 5. The salt employed is preferably sodium chloride.

According to a preferred embodiment of the process according to the invention, the dough obtained in step (a) is annealed at a temperature between 0 and 50° C., preferably between 15° and 50° C., for a time period of 1 to 120 min. prior to step (b). More preferably, the annealing step is conducted for 30-90 minutes at 20°-40° C. In this annealing step a hydrated, homogenous dough is formed. As will be apparent to the person skilled in the art, this retention time typically depends on the dough water temperature and the wheat flour quality. This hydration step can be performed in a holding tank or in a mixing device under low shear conditions. Low shear conditions are here defined as an SME of less than 5 kJ/kg, preferably less than 2.5 kJ/kg. The microstructure of the hydrated dough thus obtained typically shows protein enriched spots or aggregates spread around starch granules.

The process according to the invention is preferably carried out in a shearing device that can be operated to provide an essential simple shear flow with a shear stress of at least 1 kPa and a specific mechanical energy input of at least 5 kJ/kg.

According to a first preferred embodiment of the present invention, the shearing device in which the process is preferably performed is of the cone and plate (or cone-cone) type comprising a rotating plate, a non-rotating cone and an engine to rotate the plane of the device, wherein the angle between the rotating plane and the non-rotating cone is between 0.1° and 5°, preferably between 0.5° and 4° and wherein the cone angle is between 80° and 100°. When employed in the process of this invention, the dough is introduced between the plate and the cone. The advantages of this device is an essentially constant shear across the conical gap since the linear velocity between cone and plate increases with increasing distance from the axis of the rotating plate as will be explained below. Consequently, step (b) of the process according to the invention is preferably conducted in a cone and plate or cone-cone type reactor.

According to a second preferred embodiment of the present invention, the shearing device is of the Couette type or concentric cylinder type comprising an outer cylinder and an inner cylinder. The outer and inner cylinders define an annulus in the volume between the exterior surface of the inner cylinder and the interior surface of the outer cylinder. When employed in the process of this invention, the dough is contained in the annulus. According to this second preferred embodiment of the invention, step (b) is preferably conducted in a Couette type or concentric cylinder type reactor.

According to the invention, the reactor and device according to the first preferred embodiment is preferred over the reactor and device according to the second preferred embodiment as will be explained below.

The devices are preferably provided with a heating means to enable to control the temperature during shearing at a temperature of between 20° and 40° C., preferably 25° to 40° C. It is found that processing temperatures above about 40° C. may have an adverse effect on the quality of the gluten produced and/or on the separation process.

The shear rate is preferably 2-100 $s^{-1}$, more preferably 10-60 $s^{-1}$ and in particular 20-50 $s^{-1}$. The shear rate can for instance be kept constant, but it is also possible to apply an increment.

After step (b) of the process of the present invention, the processed dough is separated into a gluten enriched fraction and a starch enriched fraction. The separation step may be conducted with traditional separation techniques that are known in the art. The starch enriched fraction can for instance be obtained by centrifugation with decanters or hydrocyclones, whereas the gluten enriched fraction is conveniently separated by screening. Without any additional water or without performing a commonly used washing step, a gluten enriched fraction comprising at least 50 wt %, preferably at least 60 wt % of gluten proteins can be isolated. If the cone and plate device is used to conduct step (b) of the process according to the invention, such a device has the advantage that there is an absolute velocity profile (but constant shear) across the conical gap thereby providing even a higher enrichment of the gluten fraction. The gluten enriched fraction is, after drying, suitable for industrial baker applications In addition, the gluten enriched fraction can be further upgraded by washing with water, e.g. by employing the conventional Martin process.

The present invention also relates to a process for making a dough, said process comprises the steps of:
(i) mixing a flour and an aqueous liquid to obtain a dough having a moisture content of less than 50% based on dry weight of the flour; and
(ii) subjecting the dough obtained in step (3) to a essential simple shear flow with a shear stress of at least 1 kPa and a specific mechanical energy input of at least 5 kJ/kg.

The dough according to this process can be subjected to a separation process, e.g. step (c) of the process to separate the processed dough into a gluten enriched fraction and a starch enriched fraction as disclosed above. However, the dough produced by this process may also find other applications.

Product Properties

The efficacy of the process according to the invention in comparison with the known kneading processes can be demonstrated as follows. For example, analysis of samples taken from the starch enriched fractions that were obtained with the process according to the present invention showed that the amount of gluten in the starch enriched fractions was reduced. Even a more pronounced effect was observed in the gluten enriched fractions which contained over 50 weight percent of proteins. Due to the excess in starch in the starting product, the increase in starch concentration was less pronounced.

The quality of gluten can be evaluated by several rheological methods. One of the methods of choice is the method described below. Studying large deformation rheological and fracture properties of gluten dough under uniaxial extension test was carried out according to a method described by Sliwinski et al. (Sliwinski, E. L., F. van der Hoef, P. Kolster, and T. van Vliet. 2004. Large-deformation properties of wheat dough in uni- and biaxial extension. Part ii. Gluten dough. Rheologica Acta 43: 321; incorporated by reference). Gluten obtained by the process according to the invention was compared with gluten obtained from dough made by conventional z-blade mixing (optimal mixing time, rested for 60 minutes) which involves both shear and elongation. Results are presented in Example 4 and FIG. 1. This figure shows significantly higher values of strength (FIG. 1A), extensibility (FIG. 1B) and total energy of extension (FIG. 1C) for gluten from the invented process.

Surprisingly, the dough made in the processes of the invention has improved properties when compared to a dough made by conventional mixing processes. In particular, the dough according to the invention has an improved apparent strain hardening value $d\ln\sigma/d\epsilon_H$. In addition, the dough according to the invention has an improved GMP wet weight content. In particular, the dough according to the present invention has an apparent strain hardening value $d\ln\sigma/d\epsilon_H$ which is up to 5% less than the apparent strain hardening value $d\ln\sigma/d\epsilon_H$ of a ZD-dough. Furthermore, the dough according to the present invention has a GMP wet weight of at least 80% of the initial GMP content of the flour employed in a process for making said dough, calculated as dry matter. Obviously, it is preferred that the latter process is a process comprising steps (i) and (ii) disclosed above.

It was surprisingly found that the gluten as obtained by the process of the present invention (indicated as "shearing") have improved properties when compared with gluten obtained by conventional mixing processes (indicated as "mixing"). In particular, the gluten as obtained by the process of the present invention have a higher maximum stress (max and a higher extensibility (expressed as Henky strain). Accordingly, the gluten as obtained by the process according to the invention are characterised by:

$\sigma_{max}$ (shearing)/$\sigma_{max}$ (mixing) is greater than 1.2, and
Henky strain (shearing)/Henky strain (mixing) is greater than 1.1.

Preferably, $\sigma_{max}$ (shearing)/$\sigma_{max}$ (mixing) is greater than 1.25, more preferably greater than 1.30, and in particular greater than 1.35.

Preferably, Henky strain (shearing)/Henky strain (mixing) is greater than 1.15 and more preferably greater than 1.20.

The effect of the simple shear treatment vs. conventional mixing on rheological properties of the dough under uniaxial extension was compared (cf. Example 3). It was surprisingly found that upon simple shearing the apparent strain hardening value $d\ln\sigma/d\epsilon_H$ of the dough was reduced much slower than upon conventional mixing. The present invention therefore also relates to a gluten enriched fraction obtainable from a processed dough as obtained in step (b) of the process according to the invention, wherein the decrease of the apparent strain hardening value $d\ln\sigma/d\epsilon_H$ of said processed dough is less than 5%, relative to the apparent strain hardening value $d\ln\sigma/d\epsilon_H$ of a ZD-dough. Alternatively, the gluten enriched fraction obtainable from a processed dough as obtained in step (b) has an apparent strain hardening value $d\ln\sigma/d\epsilon_H$ that is at least 95% of the apparent strain hardening value $d\ln\sigma/d\epsilon_H$ of a ZD-dough.

Figure 3:
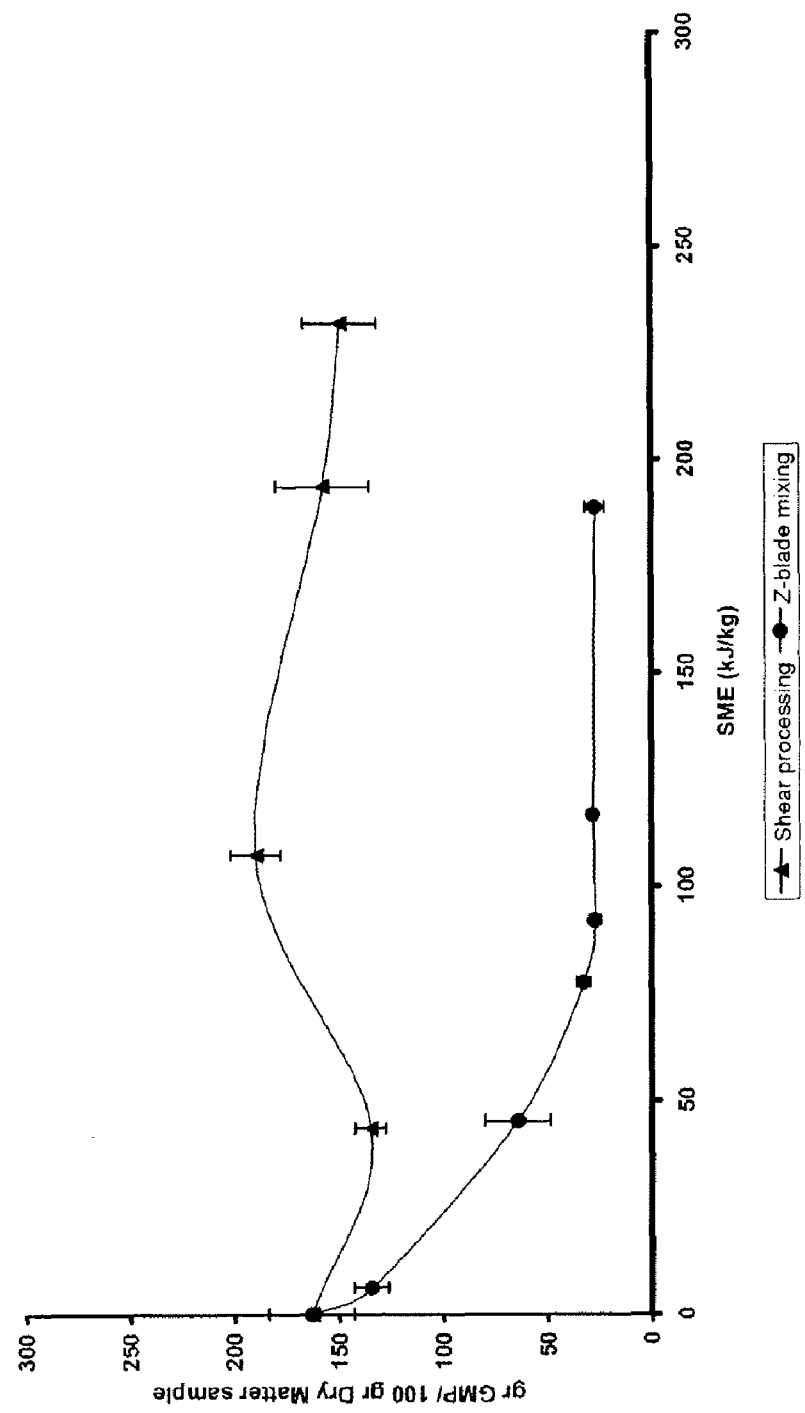
FIG. 3 shows the GMP content of the dough prepared from Soissons flour with the process according to the present invention.

Another important parameter related to gluten quality is the glutenin macropolymer (GMP) content in dough. When conventional mixing, i.e. kneading, is employed, the GMP content rapidly decreases with processing time. However, the process according to the invention has no detrimental effect on GMP content of the dough as is shown in FIGS. 2 and 3 for dough prepared from Spring flour and Soissons flour, respectively. Consequently, the process according to the invention provides a dough wherein the GMP wet weight of the dough is at least 80%, preferably at least 90%, of the initial GMP content of the original flour, calculated as dry matter. →? The present invention therefore also relates to a gluten enriched fraction obtainable from a processed dough as obtained in step (b) of the process according to the invention, wherein said processed dough has a GMP wet weight of at least 80% of the initial GMP content of the flour employed in step (a) of the process according to the invention, calculated as dry matter.

The gluten enriched fraction comprises gluten particles having an average particle size that is at least identical to that of the original wheat flour. This is attributed to the fact that the simple shear treatment does not lead to disruption of glutenin particles observed under common mixing conditions such as kneading. Instead, the shear induced deformation may lead to aggregation of the glutenin particles into larger strands, resulting in an increased effective particle size. A size distribution curve of the shear processed and isolated gluten fraction has its highest peak in terms of volume at a particle diameter higher than 10 µm. The minimum particle size in the shear processed and isolated gluten enriched fraction is higher than 0.5 µm, preferably higher than 1 µm. Particle sizes were determined according to the method disclosed in C. Don et al., J. Cereal Sci. 37, 1-7 (2003).

Another advantage of the process according to the present invention is that with processes known in the art a residual fraction of low economic value is obtained. The quantity of this residual fraction is far less when the process according to the invention is used.

EXAMPLES

Example 1

1.1. Materials

Spring and Soissons flour samples were supplied by WCFS, Wageningen, the Netherlands. Spring is a strong and hard Canadian and Soissons is a weak French wheat cultivars. According to the supplier both flours are pure and obtained from single wheat cultivars. A gluten-starch (GS) mixture with 11% gluten (db) was selected as a weak raw material source. Commercial wheat gluten and starch were obtained from Roquette Co. (France). Sodium dodecyl sulphate (SDS) was obtained from Sigma having a purity higher than 99%. All other chemicals and staining agents used were at least of analytical grade.

1.2. Analytical Methods

Moisture and ash content and the Farinograph characteristics of raw materials were determined following the AACC Approved Methods 44-15A, 08-01 and 54-21, respectively (AACC, 2000; Approved Methods of the AACC $10^{th}$ Ed. American Association of Cerial Chemists, St. Paul, Minn.). The protein contents (N×5.7) of flour and freeze-dried GMP samples were determined by the Dumas method (Sebecic, B. and Balenovic, J, "Rapid ecologically acceptable method for wheat protein content determination—comparison of methods", Deutsche Lebensmittel Rundschau 97, 221-225 (2001)) using an NA2100 Nitrogen and Protein Analyzer (Thermo-Quest-CE Instruments, Rodeno, Italy). Methionin was used as a standard. The chemical and physicochemical characteristics of the materials used in these experiments are presented in Table 1.

1.3. Preparation of Zero-Developed Dough for Shearing Experiments

Zero-developed (ZD) dough was prepared inside a walk-in-freezer (−18° C.) following the method of D. T. Campos et al., Cereal Chemistry 73, 105-107 (1996) with modifications as disclosed in S. H. Peighambardoust et al., Cereal Chemistry 81, 714-721 (2004). Two percent (w/w) NaCl was used in the preparation of all ZD doughs. Moisture contents of 0.42 and 0.43, respectively, based on dry weight in flour were used for the preparation of, Soissons and Spring doughs, respectively. These amounts of moisture were selected to give a successful processing (no slippage) of material used in the shearing device and also a good handling (no stickiness) of product obtained. Frozen ZD doughs were kept inside freezer for shearing experiments.

1.4. Shearing Experiments

The simple shearing process was performed using a shearing device described previously (S. H. Peighambardoust et al., Cereal Chemistry 81, 714-721 (2004)). The cone part of the shear cell filled inside the walk-in-freezer with 215-240 g amount of frozen ZD dough. The cone was sealed with a poly ethylene film and the ZD dough was kept at 35° C. for 60 min. This holding period allowed the ice particles to melt, resulting in hydration of flours, and thus a homogenous dough. The cone was placed in the shear cell and the system was closed. The dough was rested for 30 minutes inside the cell to allow relaxation of stresses that result from the pressurized closure of system. A dough sample in this stage was taken from the cell just before starting of shear run and called "unprocessed" dough.

The shearing process was performed at temperature of 30±2° C. for all experiments and different processing times were applied. Therefore different torque curves were obtained that resulted in different levels of mechanical energy input. The sheared samples were immediately frozen in liquid nitrogen after processing.

1.5. Mixing Experiments

Mixing of flour was performed using a two-blade counter rotating batch mixer turning at a 3:2 differential speed (Do-Corder E330 equipped with a 300 g Farinograph bowl, Brabender OHG, Duisburg, Germany) connected to a computer interface and controller unit (PL 2100, Brabender measurement and control systems, Duisburg, Germany). During mixing the torque was recorded continuously. Dough was prepared with flour and 2% (w/w) NaCl. Water was added according to method 54-21, AACC approved methods (AACC, 2000; cf. above). Mixing was performed at a speed of 63 rpm and a constant temperature of 30° C. at different times. This resulted in different mechanical energy input on materials mixed. The processed samples were immediately frozen in the liquid nitrogen. The mechanical energy provided to the product during mixing was computed from the torque curve, following the equation described above. In this equation, the rotational speed of slow mixing arm (63 rpm) was used for SME calculation.

Example 2

2.1. Isolation of GMP from Flour

A flour sample (5 g) was dispersed in 75 mL petroleum ether, mixed for 15 min and centrifuged (10000 rpm, 10 min at ambient temperature). Petroleum ether residues in the defatted flour sample were evaporated by keeping the flour overnight in a fume hood at ambient temperature.

The following method was used for the isolation of GMP from flour. The defatted sample was weighed (1.55 g) in an ultra-centrifuge tube of approximately 33 mL. The tube was then placed on a Vortex mixer. While rigorous vortexing, 9.125 mL deminerlized water (demi water) was added with a calibrated dispenser. Vortexing was continued for about 10 to 15 seconds till a homogenous and lump-free suspension was obtained. Immediately after suspending, 3.875 mL 12% (w/v) SDS solution was added, followed by addition of two portions of 9 mL demi water with a dispenser to reach a final concentration of 1.5% (w/v) SDS. The tubes were then ultracentrifuged (80000 g, 30 min at 20° C.) in a Kontron Ultracentrifuge. The supernatant (SUP) was decanted and the gel-like layer found on top of the starch sediment (called GMP) was weighed immediately as GMP wet weight. This amount was expressed as grams of gel per 100 grams of sample (db). The isolation of GMP was repeated at least three times for each sample. The collected GMP was put in small tubes and kept (for maximum 24 hr) at ambient temperature for subsequent analysis. Keeping GMP in concentrated form for the above-mentioned time has no effect on the results.

2.2. Isolation of GMP from Processed Dough Samples

The frozen processed samples were freeze-dried overnight to an average moisture value of 8% based on dry weight of the material. The freeze dried dough was then powdered on a Retsch mill using a sieve of 0.25 mm. Isolation of GMP was performed as described in section 2.6 at least in three replications.

TABLE 1

| Chemical and physicochemical characteristics of wheat flour samples. | | |
|---|---|---|
| | Spring flour | Soissons flour |
| Moisture, % db | 13.5 | 13.6 |
| Ash, % db | 0.57 | 0.48 |
| Protein, % db | 16.1 | 11.3 |
| Farinograph | | |
| Optimal water absorption, expressed as moisture content based on dry weight of the flour. | 45 | 43 |
| Development time or TTP, min | 10.0 | 2.1 |
| Stability time, min | 18.0 | 9.0 |
| Time to breakdown, min | 33.0 | 11.1 |

Example 3

3.1 Sampling of Dough for Extension Testing

Two samples were taken from the sheared dough: one, taken parallel to the shear direction, was designated "P" and the other, taken perpendicular (transverse) to the shear direction, was encoded as "T". A piece of dough, approximately 7×4 cm, suitable for studying in the SMS/Kieffer Dough and Gluten Extensibility Rig (Stable Micro Systems, Godalming, Surrey, UK) was cut using a razor blade. The dough sample was placed immediately in a pre-warmed (30° C.) Petri dish. To prevent any moisture loss, the dough was covered by a glass cap and placed in a humid atmosphere (RH=85%) where it was kept at 26° C. for 45 min. This period allowed handling and transporting of dough specimens for extension testing.

After mixing, a piece of dough (approximately 20 g) was rounded gently into a small ball and kept as described for the sheared samples. The sampling of the dough for both the shear and mixing processes was carried out with as little manual manipulation as possible.

3.2 Extension Testing

A texture analyser (TA.XT2) equipped with a 5-kg load cell and a Kieffer Dough and Gluten Extensibility Rig was used to perform a uniaxial extension test on the processed dough samples according to the procedure of Smewing (J. Smewing, "The measurement of dough and gluten extensibility using SMS/Kieffer Rig and the TA.XT2 Texture analyzer", Surrey, UK: Stable Microsystems Ltd, 1995). Dough test specimens were prepared by placing a piece of dough (4×6×2 mm) onto the grooved base of the Kieffer mould. The mould was pre-warmed to 30° C. before mounting the dough. Using thin Teflon strips (2×60 mm) coated with silicon oil helped to prevent stickiness of dough to the grooves of the mould. The upper half of the mould was placed in position and tightly clamped, which distributed the dough over the channels to yield an equivalent number of dough strips of uniform geometry (3×5×53 mm). The dough was rested inside the mould at 26° C. and 90% RH for 45 min. This resting period was followed 45 min resting of the dough after sampling and before moulding. Therefore all extension tests were carried out after a total resting time of 90 min After the relaxation time, the tension in the clamp was released and the mould was transferred to a temperature and humidity controlled cabinet (26° C., ca. 90% RH), where the TA had been placed beforehand. Before doing the extension test, the mould was equilibrated to the atmosphere of the surrounding cabinet for 10 min. The individual dough strips were then separated from the Teflon strips, positioned across the SMS/Kieffer Rig dough holder, and immediately tested with the TA at a hook speed of 3.3 mm/s and a trigger force of 2 g.

After each extension test, maximum resistance to extension ($R_{max}$) and the distance at peak force ($Ext_2$) was determined ([Tronsmo et al., Cereal Chem. 80, 587-595, 2003; incorporated by reference). The force-displacement curves were transformed into stress-strain data according to the method described by Dunnewind et al., J. Texture Studies 34, 537-560, 2004, incorporated by reference, taking into account changes in the dimension of the specimens being extended and assuming a constant volume for the dough sample. Uniaxial extension fracture properties were computed from the stress-strain data obtained. The maximum stress or fracture stress ($\sigma_{max}$) sustained by the specimen; the Henky strain ($\epsilon_H$) at fracture stress, and the integrated area (A) under the stress-strain curve were taken as a measure of the resistance to extension, the extensibility, and the energy required for extension, respectively. From the stress-strain plot apparent strain hardening values ($d\ln\sigma/d\epsilon_H$) were calculated (an apparent strain hardening value was computed in the strain interval 20 to 95% of fracture strain for all test specimens). The data are shown in Table 2 ("shearing" represents the process of the present invention, "mixing" represents conventional mixing processes).

TABLE 2

| Type of processing | Soisson | | Spring | |
|---|---|---|---|---|
| | SME | $d\ln\sigma/d\epsilon_H$ | SME | $d\ln\sigma/d\epsilon_H$ |
| Mixing | 81.7 | 1.46 | 121.8 | 1.73 |
| | 188.7 | 1.41 | 246.0 | 1.67 |
| | 369.7 | 1.08 | 419.6 | 1.25 |
| Shearing | 134.2 | 1.42 | 150.6 | 1.57 |
| | 253.5 | 1.33 | 236.3 | 1.63 |
| | 439.0 | 1.34 | 306.6 | 1.69 |

Example 4

From the gluten enriched fractions obtained from Soisson flour by the process according the invention, the gluten were isolated by conventional water washing techniques. Also gluten enriched fractions as produced by conventional mixing procedures (cf. Example 1, section 1.5). The results are shown in Table 3 and FIGS. 1A and 1B.

TABLE 3

| $\sigma_{max}$ (kN/m²) | Henky strain |
|---|---|
| Mixing | |
| 137 | 1.87 |
| Shearing | |
| 230 | 2.51 |

The invention claimed is:

1. A process for the separation of gluten and starch from flour comprising:
   (a) mixing the flour and an aqueous composition to obtain a dough having a moisture content of less than 50 wt % based on dry weight of the flour;
   (b) subjecting the dough to only simple shear flow deformation with a shear stress of at least 1 kPa and a specific mechanical energy input of at least 5 kJ/kg per minute processing time to obtain a processed dough; and
   (c) separating the processed dough into a gluten enriched fraction and a starch enriched fraction.

2. The process according to claim 1, wherein the flour is wheat flour.

3. The process according to claim 1, wherein the aqueous composition is water or a diluted salt solution having an ionic strength of 0.05 to 5.

4. The process according to claim 3, wherein the diluted salt solution is a sodium chloride solution.

5. The process according to claim 1, wherein the dough from (a) is annealed at a temperature between 0° C. and 50° C. for a time period of 1 to 120 min, prior to step (b).

6. The process according to claim 5, wherein the dough is annealed at a temperature between 15° C. and 50° C.

7. The process according to claim 1, wherein the processed dough has a gluten macropolymer (GMP) wet weight of at least 80% of the initial GMP content of the flour, calculated as dry matter.

8. The process according to claim 1, wherein the separating comprises centrifugation, screening, or both.

9. The process according to claim 1, wherein the dough is subjected to simple shear flow in a reactor having an absolute velocity profile.

10. The process according to claim 9, wherein the reactor comprises a cone and plate or is a cone-cone type reactor.

11. The process according to claim 1, wherein the dough is subjected to simple shear flow in a Couette type reactor.

12. The process according to claim 1, wherein the gluten enriched fraction is washed with water.

13. The process according to claim 1, wherein the gluten enriched fraction is dried.

14. A gluten enriched fraction obtainable by:
   (a) mixing a flour and an aqueous composition to obtain a dough having a moisture content of less than 50 wt % based on dry weight of the flour;
   (b) subjecting the dough to only simple shear flow deformation with a shear stress of at least 1 kPa and a specific mechanical energy input of at least 5 kJ/kg per minute processing time to obtain a processed dough; and
   (c) separating the gluten enriched fraction from the processed dough.

15. The gluten enriched fraction according to claim 14 having a minimum particle size of more than 0.5 μm.

16. The gluten enriched fraction according to claim 14, wherein the simple shear flow has an elongation rate $\epsilon$ of less than $10\ s^{-1}$.

17. The gluten enriched fraction according to claim 14, wherein the processed dough has a GMP wet weight of at least 80% of the initial GMP content of the flour, calculated as dry matter.

18. The gluten enriched fraction according to claim 14, wherein the flour is wheat flour.

19. Gluten, wherein:
$\sigma_{max}$ (shearing)/$\sigma_{max}$ (mixing) is greater than 1.2, and
Henky strain (shearing)/Henky strain (mixing) is greater than 1.1.

20. A processed dough obtainable by:
(a) mixing flour and an aqueous composition to obtain a dough having a moisture content of less than 50 wt % based on dry weight of the flour;
(b) subjecting the dough to only simple shear flow deformation with a shear stress of at least 1 kPa and a specific mechanical energy input of at least 5 kJ/kg per minute processing time to obtain a processed dough.

21. The processed dough according to claim 20, wherein the processed dough has a GMP wet weight of at least 80% of the initial GMP content of the flour calculated as dry matter.

22. Gluten according to claim 19, wherein:
$\sigma_{max}$ (shearing)/$\sigma_{max}$ (mixing) is greater than 1.3, and
Henky strain (shearing)/Henky strain (mixing) is greater than 1.5.

23. Gluten according to claim 19, wherein:
$\sigma_{max}$ (shearing)/$\sigma_{max}$ (mixing) is greater than 1.35, and
Henky strain (shearing)/Henky strain (mixing) is greater than 1.2.

24. A gluten enriched fraction obtainable by:
(a) mixing a flour and an aqueous composition to obtain a dough having a moisture content of less than 50 wt % based on dry weight of the flour;
(b) subjecting the dough to simple shear flow with a shear stress of at least 1 kPa and a specific mechanical energy input of at least 5 kJ/kg per minute processing time to obtain a processed dough; and
(c) separating the gluten enriched fraction from the processed dough,
wherein the processed dough has a GMP wet weight of at least 80% of the initial GMP content of the flour, calculated as dry matter.

25. A processed dough obtainable by:
(a) mixing flour and an aqueous composition to obtain a dough having a moisture content of less than 50 wt % based on dry weight of the flour;
(b) subjecting the dough to simple shear flow with a shear stress of at least 1 kPa and a specific mechanical energy input of at least 5 kJ/kg per minute processing time to obtain a processed dough,
wherein the processed dough has a GMP wet weight of at least 80% of the initial GMP content of the flour, calculated as dry matter.

26. A processed dough, wherein the processed dough has a GMP wet weight of at least 80% of the initial GMP content of the flour, calculated as dry matter.

27. A processed dough according to claim 26, wherein the processed dough has a GMP wet weight of at least 90% of the initial GMP content of the flour, calculated as dry matter.

* * * * *